US008046692B2

(12) United States Patent
Pogrebinsky et al.

(10) Patent No.: US 8,046,692 B2
(45) Date of Patent: Oct. 25, 2011

(54) USER INTERFACE MAPPING MODULES TO DEPLOYMENT TARGETS

(75) Inventors: Vladimir Pogrebinsky, Sammamish, WA (US); Benjamin George Johnson, Seattle, WA (US); Nagalinga Durga Prasad Sripathi Panditharadhya, Sammamish, WA (US); Udaya Kumar Bhaskara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1033 days.

(21) Appl. No.: 11/925,727

(22) Filed: Oct. 26, 2007

(65) Prior Publication Data

US 2009/0113327 A1 Apr. 30, 2009

(51) Int. Cl.
*G06F 15/177* (2006.01)
(52) U.S. Cl. .................... 715/735; 715/748; 715/765
(58) Field of Classification Search .................. 715/735, 715/748, 765
See application file for complete search history.

(56) References Cited

U.S. PATENT DOCUMENTS

| | | | |
|---|---|---|---|
| 5,870,611 A * | 2/1999 | London Shrader et al. .. | 717/175 |
| 6,559,867 B1 * | 5/2003 | Kotick et al. ................. | 715/771 |
| 7,072,960 B2 | 7/2006 | Graupner et al. | |
| 7,089,299 B2 | 8/2006 | Chetuparambil et al. | |
| 7,130,881 B2 | 10/2006 | Volkov et al. | |
| 7,155,380 B2 | 12/2006 | Hunt et al. | |
| 7,200,530 B2 | 4/2007 | Brown et al. | |
| 7,246,351 B2 * | 7/2007 | Bloch et al. .................. | 717/175 |
| 7,451,403 B1 * | 11/2008 | Srinivasan et al. ............ | 715/763 |
| 7,743,332 B2 * | 6/2010 | Clark et al. ................... | 715/736 |
| 7,761,809 B2 * | 7/2010 | Bukovec et al. ............... | 715/810 |
| 2002/0033843 A1 * | 3/2002 | Loos et al. ..................... | 345/740 |
| 2003/0184580 A1 * | 10/2003 | Kodosky et al. ............... | 345/734 |
| 2003/0218628 A1 * | 11/2003 | Deshpande et al. ........... | 345/738 |
| 2004/0027377 A1 * | 2/2004 | Hays et al. ..................... | 345/760 |
| 2006/0090136 A1 * | 4/2006 | Miller et al. ................... | 715/734 |
| 2006/0230314 A1 * | 10/2006 | Sanjar et al. ..................... | 714/26 |
| 2007/0198973 A1 | 8/2007 | Choi et al. | |
| 2007/0233698 A1 | 10/2007 | Sundar et al. | |
| 2007/0250783 A1 * | 10/2007 | Wu et al. ........................ | 715/762 |
| 2008/0163063 A1 * | 7/2008 | Bonev et al. ................... | 715/734 |
| 2008/0163124 A1 * | 7/2008 | Bonev et al. ................... | 715/853 |

OTHER PUBLICATIONS

Deployment Time Optimization of Distributed Applications. (11 pages) http://www.research.ibm.com/people/k/kangwon/publications/deployment_time_optimization.pdf.
Managing the Configuration Complexity of Distributed Applications in Internet Data Centers (1 page) http://ieeexplore.ieee.org/xpl/freeabs_all.jsp?tp=&arnumber=1607881&isnumber=33764.
Monitoring in .NET Distributed Application Design (17 pages) http://msdn2.microsoft.com/en-us/library/ms954612.aspx.
Optimization (mathematics) (7 pages) http://en.wikipedia.org/wiki/Optimization_%28mathematics%29.

* cited by examiner

*Primary Examiner* — Ashraf Zahr
(74) *Attorney, Agent, or Firm* — Workman Nydegger

(57) ABSTRACT

An interactive user interface for displaying mappings between modules of a distributed application and deployment targets in a distributed environment. The user interface represents module items, deployment target items, and correlation items that represent various mappings of module items to deployment target items. In some cases, the manner in which each of these items is displayed may be altered in response to user input. The correlation itself may also be potentially altered in response to user input. Multiple solutions may be displayed in which there are different mappings of modules to target solutions.

20 Claims, 8 Drawing Sheets

USER INTERFACE MAPPING MODULES TO DEPLOYMENT TARGETS

BACKGROUND

Applications often contain multiple application modules. Distributed applications are deployed on multiple distributed physical machines. In other words, the various application modules are assigned to a particular machine in the distributed environment, and then the modules are installed and properly configured to operate on their corresponding assigned machine. As the distributed environment changes, the distributed application may be redeployed to maintain or improve performance.

Conventionally, such deployment or redeployment is commonly a manual process. For example, a distributed application may be associated with a text document that describes how and when to deploy and activate parts of an application and what to do when failures occur. An individual may then manually act as instructed in the text document to deploy (and redeploy) the distributed application.

BRIEF SUMMARY

Embodiments described herein relate to an interactive user interface for displaying mappings between modules of a distributed application and deployment targets in a distributed application. The user interface represents module items, deployment target items, and correlation items mapping module items to deployment target items. In some embodiments, the manner in which each of these items is displayed may be altered in response to user input. The correlation itself may also be potentially altered in response to user input. In some embodiments, multiple solutions may be displayed in which there are different mappings of modules to target solutions.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an interactive user interface displays mappings between modules of a distributed application and deployment targets in a distributed environment. The user interface displays module items, deployment target items, and correlation items that represent mappings of module items to deployment target items. In some cases, the manner in which each of these items is displayed may be altered in response to user input. The correlation itself may also be potentially altered in response to user input. Multiple solutions may be displayed in which there are different mappings of modules to target solutions.

First, after some introductory discussion regarding computing systems in general, a basic computing system will be described with respect to FIG. 1. Then, various embodiments of the an interactive user interface for mapping modules to deployment targets will be described with respect to FIGS. 2 through 8. Finally, a mechanism for conducting the deployment itself will be described with respect to FIGS. 9 through 12.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
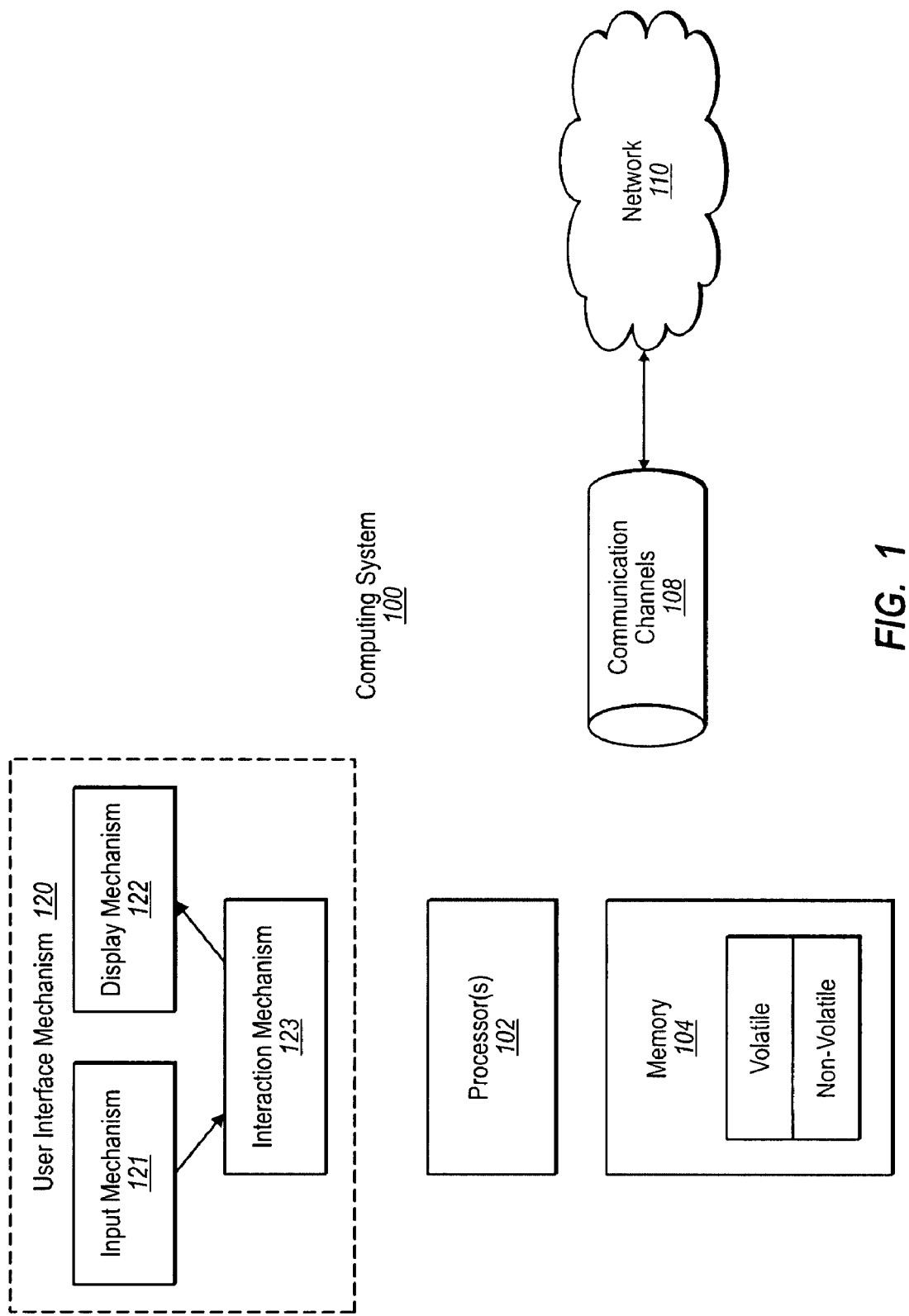
FIG. 1 illustrates a example computing system that may operate to display an interactive module to target mapping.

Referring to FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). Software applications may have a number of constituent interrelated modules. In distributed applications, different modules of the application may be deployed on different physical machines.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The computing system 100 also includes a user interface mechanism 120 that includes an input mechanism 121, a display mechanism 122, and an interaction mechanism 123. The type of input mechanism 121 may differ depending on the physical form of the computing system 100. Examples of input mechanisms include keyboards, pointer devices, and even perhaps the input components of an interactive display. The type of display mechanism 122 may also different depending on the physical form of the computing system 100. For instance, the display mechanism 122 may be larger for larger computing systems, and smaller for handheld computing systems. The interaction mechanism 123 receives user input via the input mechanism 121 and appropriately adjusts what is displayed on the display mechanism 122.

Figure 2:
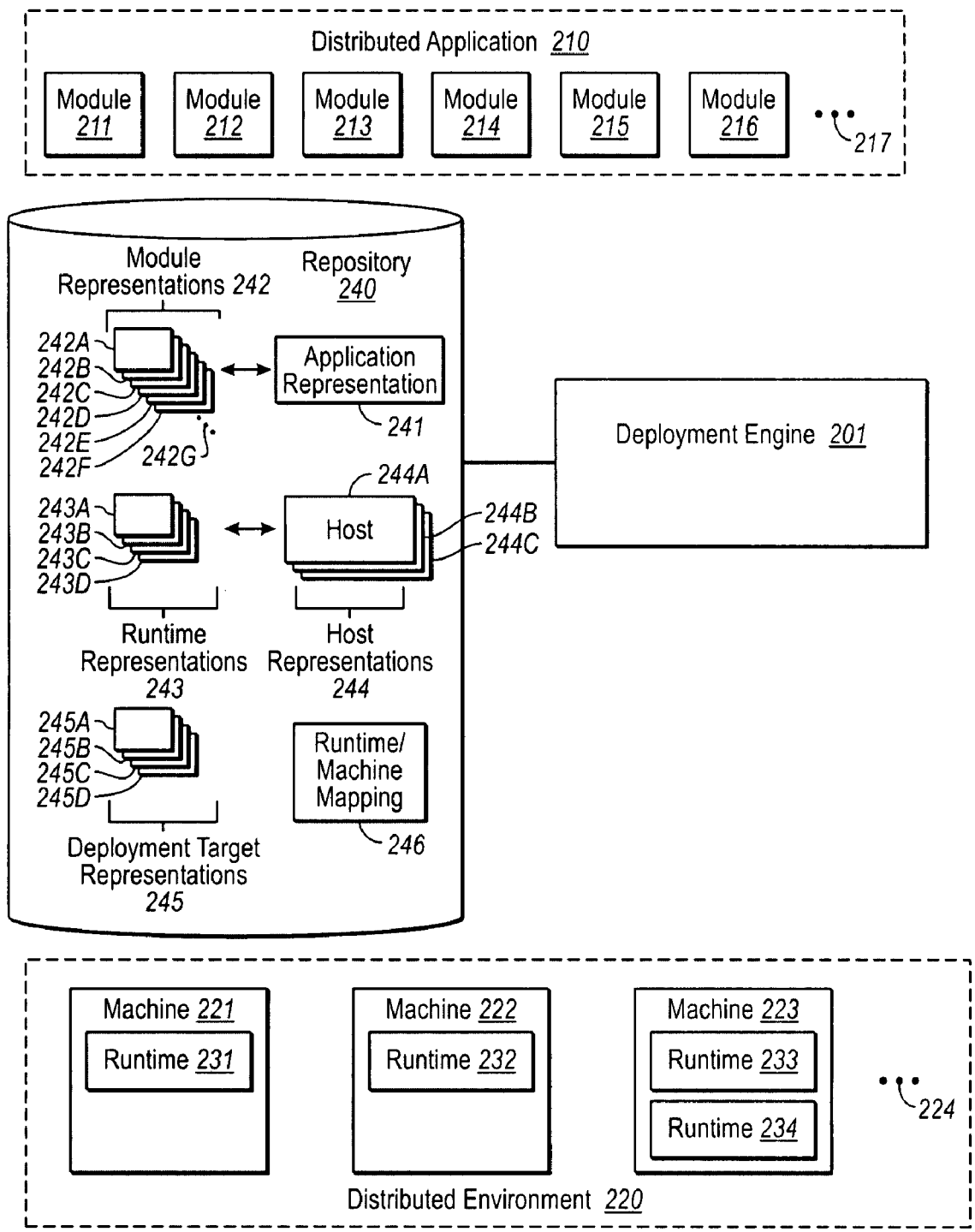
FIG. 2 illustrates a deployment environment in which a distributed application is deployed in a distributed environment.

FIG. 2 illustrates a deployment environment 200 showing a deployment engine 201 deploying a distributed application 210 into a distributed environment 220. The distributed application 210 includes multiple modules 211 through 216. The distributed environment 220 includes multiple physical machines 211 through 213. The distributed environment 220 is illustrated as including physical machines 221 through 223.

The horizontal ellipses 217 and 224 represent that the deployment engine 201 may operate to deploy a distributed application 210 having any number (two or more without limit) of multiple modules to a distributed environment 220 that has any number (two or more without limit) of multiple machines.

Although not required, the deployment engine 201 may also be implemented as an application (distributed or otherwise) present on a computing system, such as the computing system described with respect to FIG. 1. The deployment engine 201 may also have a user interface associated therewith to display mappings between the various modules of the distributed application to an appropriate deployment target in the distributed environment.

Each physical machine is illustrated as having therein a particular runtime. For instance, physical machine 221 is shown is running runtime 231, physical machine 222 is shown as running runtime 232, and physical machine 223 is shown as running two runtimes 233 and 234. When a module of an application runs on a computing system, that module will often call upon and use the functionality provided by a library of underlying modules that were already installed and operational on the computing system. Such libraries are often called "run-times" or "runtimes" because they are available for any application to use while running on the computing system that has the runtime deployed thereon. In that sense, runtimes may be considered to be part of the environment offered by a physical machine, albeit an environment that is provided by a library of software functionality. Examples of existing runtimes include SQL, SharePoint, BizTalk, and others. That said, the deployment engine 201 is extendible to runtimes that are not even developed yet.

The deployment engine 201 has access to a repository 240, that represents any memory and/or storage (such as a database) that may hold data. The repository 240 contains a module representation for each of the modules in the distributed application. For instance, module representations 242A through 242G (collectively referred to as "module representations 242") represent module data for each of corresponding modules 211 through 217 of the distributed application 210. The repository 240 may also contain an application representation 241 that represents properties and characteristics of the distributed application 210 as a whole. In one embodiment described further below, the module representations 242 and the application representation 241 are declarative models. However, the broader principles of the present invention are not limited to the format or type of the module representations 242 or application representation 241.

The repository 240 also includes a number of deployment target representations 245 including deployment target representations 245A, 245B, 245C and 245D. In this description, a module is deployed on a target machine when the module is made operational on the target machine. This may involve 1) installing the module on the target machine, 2) configuring the module so as to be operational, 3) performing any further action on the machine (such as a reboot of the physical machine, and/or reinitializing of one or more applications on the physical machine), and/or 4) adjusting operating system data on the physical machine (such as a registration table or system registry).

Accordingly, a "deployment target" is a specific environment into which a module might be deployed. For instance, referring to FIG. 2, there are three physical machines 221, 222 and 223. Each of those physical machines may be considered a deployment target available in the distributed environment. In the alternative, and in the example described in further detail below, a particular runtime and physical machine combination may be considered to be a deployment target. For instance, in the distributed environment 220, there are four potential deployment targets listed as follows:

1) the combination of runtime 231 and physical machine 221;
2) the combination of runtime 232 and physical machine 222;
3) the combination of runtime 233 and physical machine 223; and
4) the combination of runtime 234 and physical machine 223.

The repository 240 also includes runtime representations 243 including a runtime representation 243A that represents properties and characteristics of the runtime 231. In addition, the runtime representations 243B through 243D represent properties and characteristics of the corresponding runtimes 232 through 234. Physical machine representations 244 represent properties and characteristics of physical machines present in the distributed environment 220. For instance, physical machine representations 244A through 244C represent properties and characteristics of corresponding physical machines 221 through 223.

The repository 240 may also include a runtime/machine mapping representation 246 that identifies the runtimes that are present on each physical machine. Accordingly, in the embodiment in which a deployment target is a combination of a runtime and a physical machine, the runtime/machine mapping representation 246 may be used to formulate deployment target representation 245A as the combination of the runtime representation 243A and machine representation 244A, deployment target representation 245B as the combination of the runtime representation 243B and machine representation 244B, deployment target representation 245C as the combination of the runtime representation 243C and the machine representation 244C, and deployment target representation 245D as the combination of the runtime representation 243D and the machine representation 244C. In one embodiment described further below, the deployment target representations are constructed from one or more declarative models. However, the principles of the present invention are not limited to any particular form or type for the deployment target representations.

Figure 3:
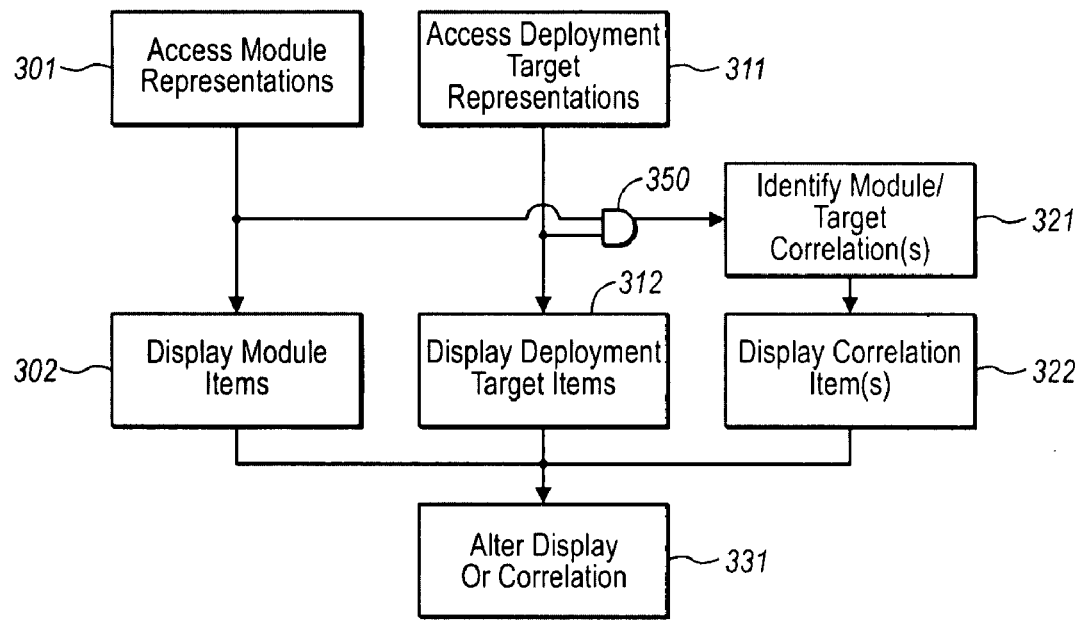
FIG. 3 illustrates a flowchart of a method for displaying an interactive module to target mapping.

FIG. 3 illustrates a flowchart of a method 300 for providing an interactive user interface for displaying mappings between modules of a distributed application and deployment targets in a distributed environment.

According to the method 300, module representations for the distributed application are accessed (act 301). For example, referring to FIG. 2, the deployment engine 201 may access the module representations 242A through 242G corresponding to modules 211 through 217 of the distributed application 210. Each module representation represents one, some or all of the properties and characteristics of its corresponding module. For instance, module representation 242A may represent properties and characteristics of the module 211 of the distributed application 210. An example in which the module representations are formed using a declarative model will be described with respect to FIGS. 9-12. However, the module representations need not be declarative.

In addition, deployment target representations for the distributed environment are accessed (act 311). For example, referring to FIG. 2, the deployment engine may access the deployment target representations 245A through 245D. Each deployment target representation represents one, some or all of the properties and characteristics of its corresponding deployment target. For instance, deployment target representation 245A may represent properties and characteristics of the deployment target represented by the combination of the machine 221 and runtime 231.

Once the module representations and the deployment target representations are both accessed (as represented by the symbolic AND gate 350), the method 300 may then identify one or more correlations between modules of the distributed application and corresponding deployment targets in the distributed application (act 321). These correlations may be identified using the module representations and the deployment target representations. An example of how this might be accomplished is described below with respect to FIGS. 9 through 12.

Figure 4:
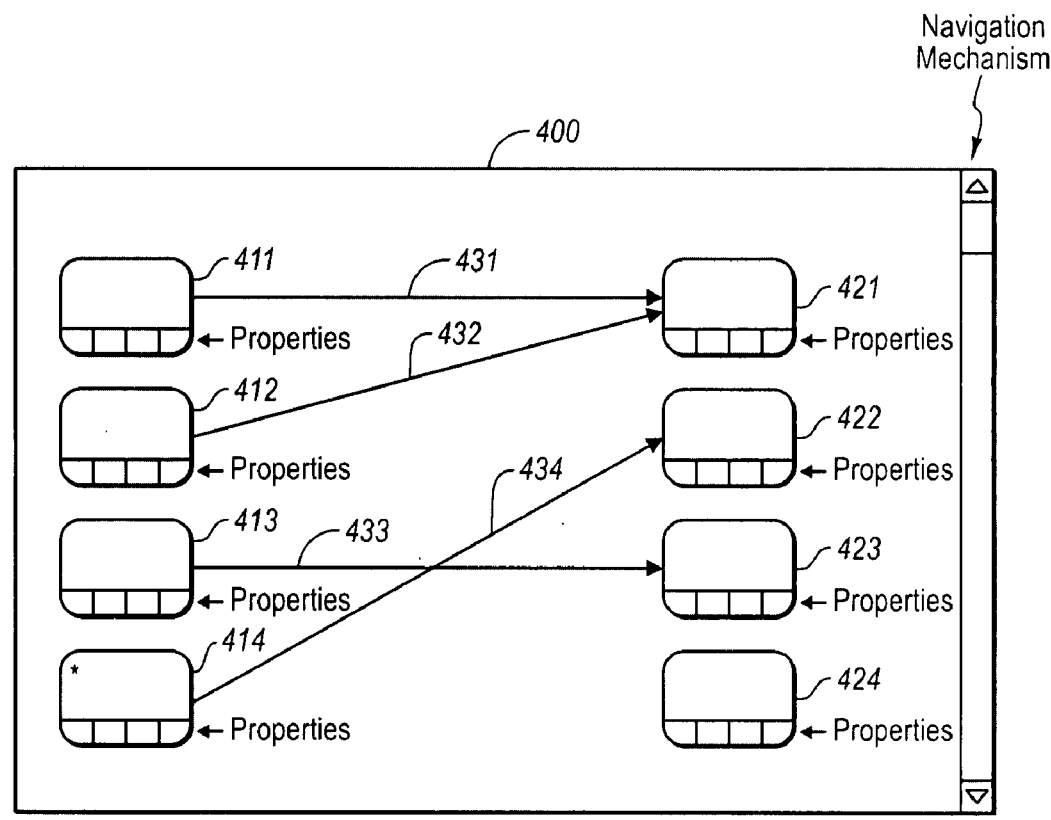
FIG. 4 illustrates a user interface that shows multiple module items of a distributed application being mapped to multiple deployment targets of a distributed environment.

The method 300 may use the module representations to display a number of module items (act 302), where each module item represents one or more modules of the distributed application. For instance, FIG. 4 illustrates a user interface 400 that may be generated by the method 300. The user interface 400 includes module item 411 that visually represents the module 211, module item 412 that visually represents the module 212, module item 413 that visually represents the module 213, and module item 414 that visually represents a collection of modules including modules 214, 215 and 216. The module item 414 is labeled with an asterisk to indicate that it represents a collapsed form of several modules. Such collapsed module items may be used to visually group multiple modules. Such collapsing may be helpful in the case where they share common properties and characteristics that allow all of the grouped modules to be deployed to the same deployment target.

Each of the module items may, but need not, also display one or more properties of the corresponding module. For instance, the properties might include the module's name, technology type, required runtime, security isolation requirements (can be shared, requires exclusive process, requires exclusive machine, etc.), minimum or maximum resource requirements (CPU, memory, disk I/O), availability requirements (percentage of uptime, e.g. 99.9999% uptime), scalability requirements (e.g. can be deployed to clusters, etc.), and so forth. The types of properties displayed may change depending on what might be useful to the user given the context of the mapping operation.

The method 300 may use the deployment target representations to display a number of deployment target items (act 312), wherein each deployment target item represents one or more deployment targets of the distributed environment. For instance, FIG. 4 illustrates deployment target item 421 that represents the deployment target combination of the machine 221 running runtime 231, deployment target item 422 that represents the deployment target combination of the machine 222 running runtime 232, deployment target item 423 that represents the deployment target combination of the machine 223 running runtime 233, and deployment target item 424 that represents the deployment target combination of the machine 223 running runtime 234. Although not illustrated in this example, the deployment target representations may also be represented in collapsed form. That might be helpful in the case, for example, in which multiple deployment targets share similar properties and characteristics to the extent that it is not critical which deployment target is used when actually deploying modules to one of the deployment targets.

Each of the deployment target items may, but need not, also display one or more properties of the corresponding deployment target. For instance, the displayed properties might include runtime properties or machine properties. Example runtime properties might include, for example, the runtime's name, technology type (e.g. SQL server, SharePoint server, BizTalk server, etc.), version, clustering support, and so forth. Examples of machine properties might include, for example, the machine's name, model, number of CPUs, CPU speed (MHz), available memory, available hard drive space hard drive speed, and so forth. The types of properties displayed may change depending on what might be useful to the user given the context of the mapping. The properties of the module items, and deployment target items are illustrated as being along the bottom of each item in FIG. 4, and in subsequent drawings. However, there is no requirement as to how displayed properties may be visually associated with an item.

The method 300 also displays a correlation item for each identified correlation between a module item and a deployment target item (act 322). For instance, referring to FIG. 4, the user interface 400 illustrates an arrow 431 visually representing a correlation between module item 411 and deployment target 421. If this mapping were ultimately selected, this might result in the corresponding module(s) being deployed on the corresponding deployment target(s). The user interface 400 also illustrates an arrow 432 representing a correlation between the module item 412 and the deployment target item 421, an arrow 433 representing a correlation between the module item 413 and the deployment target item 423, and arrow 434 representing a correlation between the module item 414 and the deployment target item 422. Upon acceptance of these correlations, the modules for each of the module items may be actually deployed onto their corresponding deployment target represented by the correlated deployment target item. The correlations may be identified by the deployment engine itself without user input, although the user may also specify the correlation. An example of how the correlation might be automatically identified is described with respect to FIGS. 9 through 12.

The user interface 400 may be interactive. For instance, referring to FIG. 1, the user interface 400 may be displayed using display mechanism 122. However, the interaction mechanism 123 may cause the user interface 400 to change in response to user input provided via the input mechanism 121.

Accordingly, the method 300 includes an act of altering (act 331) at least one, some or all of the following in response to user input: a) the manner in which the plurality of module items are displayed; b) the manner in which the plurality of deployment target items are displayed; c) the manner in which the correlation item(s) are displayed; or d) the identity of the deployment target to which the module is correlated. One, some, or all of these may also be altered in response to computationally comparing at least some of the plurality of module representations to the at least the plurality of deployment target representations; One, some, or all of these may also be altered in response to a change in the underlying properties of the module representations and/or deployment target representations. For example, if the module or deployment target representation is a declarative model, one of the declarative properties might be added, deleted, or altered.

For instance, the user experience may be simplified by leveraging contextual filtering technique. For example, when user clicks to configure a module having a particular technology type, perhaps all of the deployment targets having runtimes capable of supporting modules of that technology type are auto-arranged to be in a certain part of the screen. For instance, perhaps the deployment target items suitable for that module are moved to the top of the display, moved closer to the selected module, made larger or brighter, or have some other visual emphasis applied. The deployment target items that are not capable of supporting the selected module may be visually deemphasized in some manner. For example, such deployment target items may be grayed out, made smaller, or even made to disappear entirely. Different cursors may be displayed when hovering over deployment target items that can support a module as compared to those that cannot.

The arrangement may also have some mechanism for identify a ranking when there are multiple solutions to a mapping. An example of such a ranking mechanism is described below with respect to FIG. 11. For example, when selecting a module item, appropriate deployment target items may be emphasized if the deployment engine determines them to be appropriate. In addition, if the deployment engine ranks the appropriate deployment target items, the user interface 400 may have a mechanism for even further emphasizing the higher and highest ranked deployment targets. For example, if all of the appropriate deployment targets are moved to the top of the user interface, perhaps the highest ranked deployment target item for that module item is moved to the very top. Likewise, when selecting a deployment target, the user interface might visually emphasis the appropriate modules that could be deployed in that deployment target, and even further visually emphasize those modules that have highest ranking for deploying on the deployment target.

As a further example, the user interface 400 might automatically, or in response to user input, arrange deployment target items according to the organization infrastructure of the distributed environment. For instance, deployment targets may be organized according to presence in a DeMilitarized Zone (DMZ), security roles, technology, installed software versions, and so forth.

The user might also group modules and deployment targets by some criteria (e.g. if user groups by a technology type, all SQL modules/runtimes will be combined into a single group). That allows the user to map groups of modules to a group of runtimes in a single gesture and rely on system to do the rest of the mapping within specified constraints. That is particularly useful when number of modules is large and mapping groups is much faster than mapping individual group elements.

The user might select a group of modules (a "grouped module" shape such as module item 414) or multi-select several modules items to permit changing of properties for all of the corresponding modules. If the selected module represents are declarative, one or more declarations for that module may be deleted, added, or amended to reflect the change.

The user might also switch between a deployment target view and a machine view. This provides a useful pivot of the environment for running applications. Machine may have multiple runtimes—e.g. SQL, IIS and runtimes may span multiple machines—e.g. SQL cluster may run on multiple machines.

The user interface 400 may also display additional interesting items such as, for example, the following:

1. The number of configured and not configured modules;
2. The number of modules, runtimes, and machines participating in deployment;
3. For every runtime—the number of other applications already deployed to the runtime;
4. For every machine—the number of other runtimes on that machine;
5. For every machine—the overall number of modules deployed to that machine;
6. For every runtime—the overall number of modules deployed to that runtime;
7. Based on either anticipated or measured requirements for CPU, memory, Disk IO—show available/used capacity for every runtime/machine/cluster; and
8. For every runtime—analyze and show hard-drive capacity and requirements for deploying configured modules.

Figure 5A:
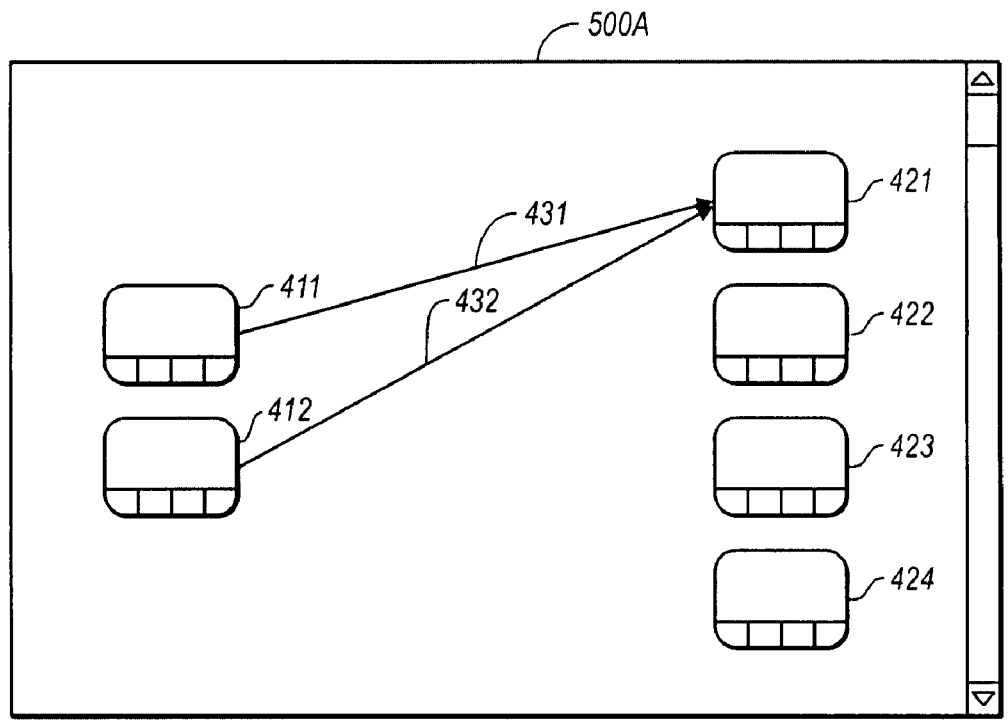
FIG. 5A illustrates a user interface similar to FIG. 4, except with only a portion of the module items being displayed.

FIG. 5A illustrates a user interface 500A in which only a few of the module items are illustrated. In this case, the deployment engine has simplified the user interface by selecting for display only those module items in the distributed application that have one or more criteria in common (e.g., common technology type). In the case of FIG. 5A, only module items 411 and 412 are shown.

Figure 5B:
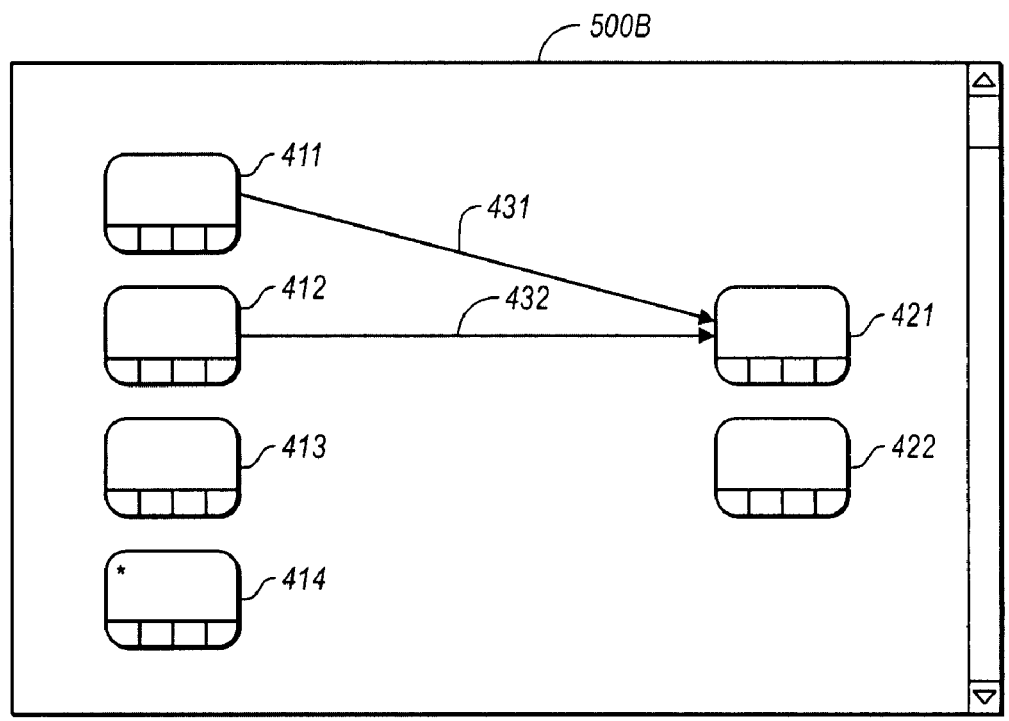
FIG. 5B illustrates a user interface similar to FIG. 4, except with only a portion of the deployment target items being displayed.

FIG. 5B illustrates a user interface 500B in which only a few of the deployment target items (i.e., deployment target items 421 and 422) are illustrated. In this case, the deployment engine has simplified the user interface by selecting for display only those deployment target items in the distributed environment that have one or more criteria in common (e.g., only those deployment targets that are appropriate targets for a selected module).

Figure 5C:
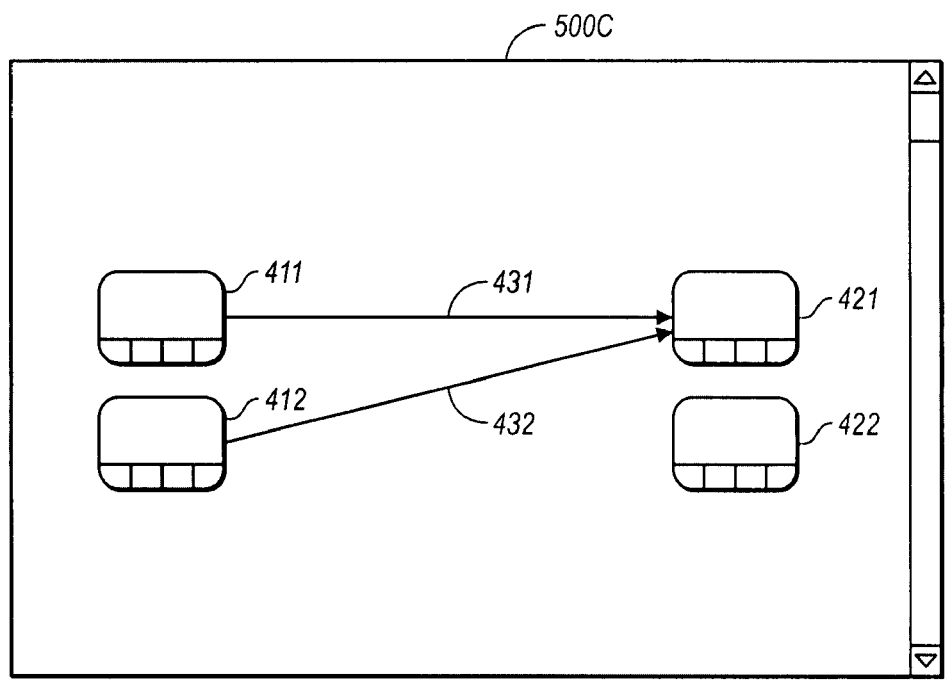
FIG. 5C illustrates a user interface similar to FIG. 4, except with only a portion of the module items and deployment target items being displayed.

FIG. 5C illustrates a user interface 500C in which only a few of the module items (i.e., module items 411 and 412) and deployment target items (deployment target items 421 and 422) are shown.

As represented by FIGS. 5A through 5C, the process of selecting a subset of the module items and deployment items for display, and then displaying that subset can significantly simplify the user experience in selecting an appropriate mapping. This may be particularly true for distributed applications having numerous modules to deploy, and for complex distributed environments having made potential deployment targets. The displayed module items and deployment target items may change dynamically in response to user input, to provide the user with an intuitive view of the mapping given the context.

Figure 6:
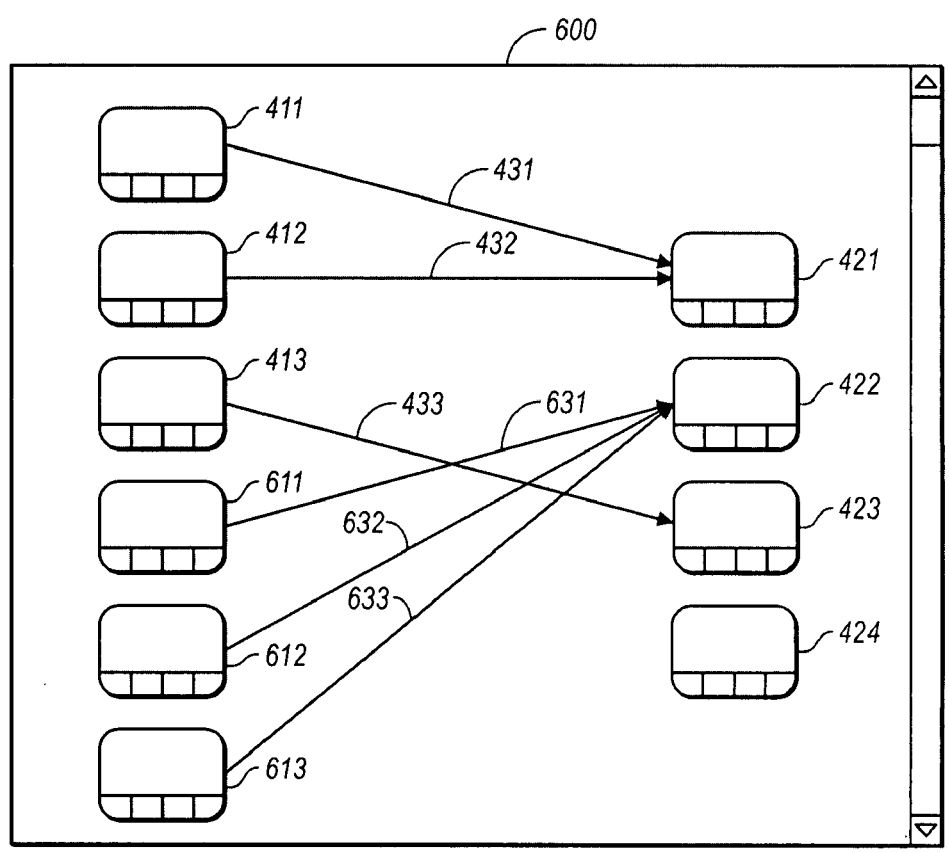
FIG. 6 illustrates a user interface similar to FIG. 4, except with the collapsed module item being expanded.

FIG. 6 illustrates a user interface 600 that is similar to the user interface 400 of FIG. 4, except that the collapsed module item 414 is now expanded to show module items 611, 612, and 613 for each of the constituent modules of the module item 414. For instance, module item 611 may visually represent module 214, module item 612 may visually represent module 215, and module item 613 may visually represent module 216. The correlation 434 has also been expanding to include correlation items 631, 632 and 633. This expanding operation may have been performed in response to user input. For example, perhaps the user selected an expand control on the module item 414 of FIG. 4. Likewise, to collapse the module items again, perhaps the user selects a collapse control on one of the module items 611, 612 or 613 to return to the user interface 400 of FIG. 4. Alternatively or in addition, the collapsing and expanding of module items and deployment items may be made dynamically independent of user input if deemed helpful to the user by the deployment engine.

In one embodiment, correlations made by the user may be visually distinguished from correlations made by the deployment engine. For instance, perhaps the arrows that are set by the user are made to be red, where those made by the deployment engine without user input are black. If a declarative model for the module and deployment target is used, if the user makes a correlation, this may be added as a declarative property to the appropriate declarative model.

Figure 7:
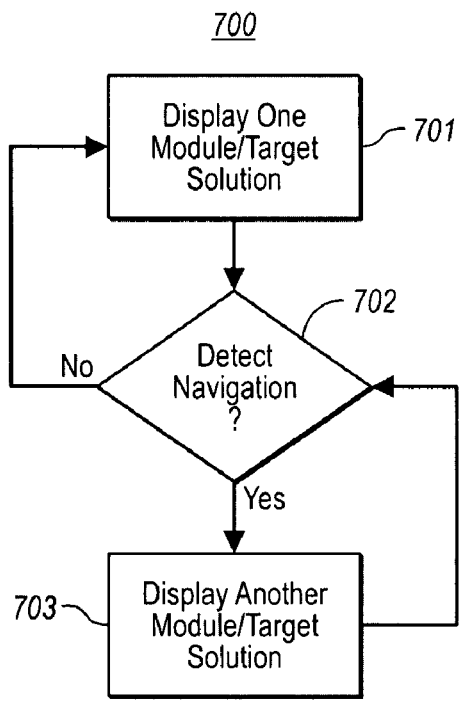
FIG. 7 illustrates a flowchart of a method for navigating through multiple displayed solutions of mappings between modules and deployment targets.

If the deployment engine were to identify an appropriate mapping between module items and deployment target items, there may potentially be multiple possible solutions to such mappings. As a user enters further constraints to the model (e.g., by assigning specific correlations), the possible solutions may be reduced dynamically. FIG. 7 illustrates a flowchart of a method 700 for providing a navigation mechanism for permitting a user to navigate through a plurality of identified solutions for mapping a plurality of modules of a distributed application to a plurality of deployment targets in a distributed environment.

First, a plurality of solutions are identified for mapping modules of a distributed application to deployment targets. A first solution is then displayed (act 701). The display of the first solution includes a number of module items, a number of deployment target items, and at least one correlation item representing the mapping between the modules and the deployment targets (act 701). The user interface 400 of FIG. 4 represents one such example of a first solution.

Figure 8:
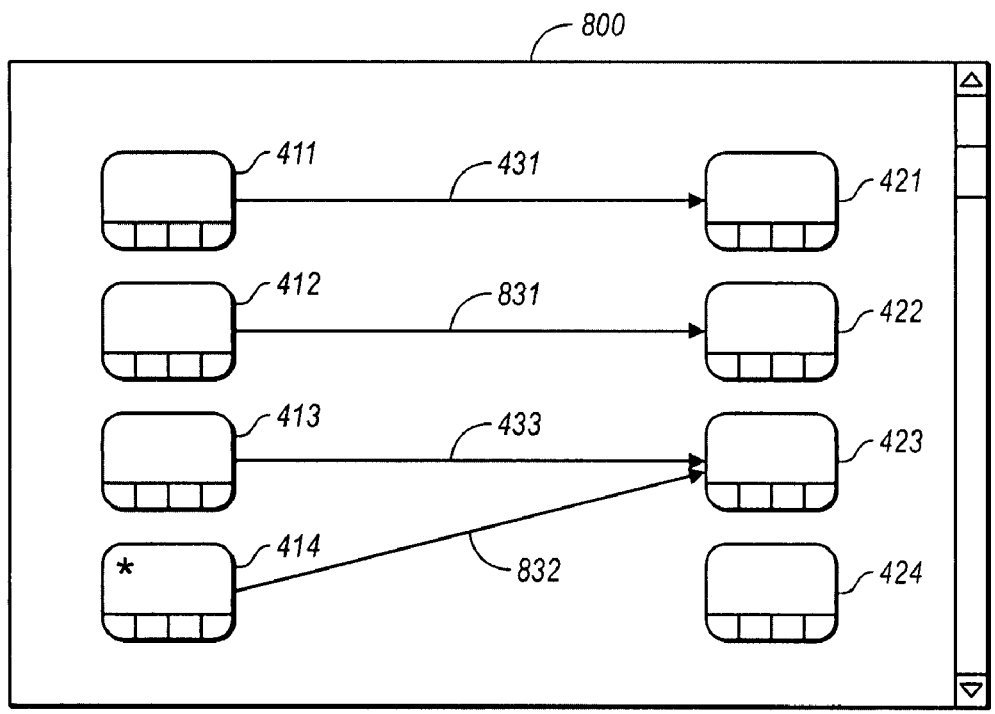
FIG. 8 illustrates a user interface similar to FIG. 4, except with a second mapping solution of modules to deployment targets being displayed.

If a navigation instruction from a user is not received (No in decision block 702), perhaps the solution continues to be displayed. However, if a user-issued navigation instruction is detected (Yes in decision block 702) then another solution is displayed in the display (act 703). FIG. 8 illustrates a user interface 800 showing an alternative solution to the mapping displayed in the user interface of FIG. 4. Such an alternative mapping may be obtained by issuing a navigation instruction using, for example, the scroll bar.

In the alternative user interface 800, module item 411 continues to be shown mapped to deployment target item 421 as represented by arrow 431, and module item 413 continues to be shown mapped to deployment target item 423 as represented by arrow 433. However, the user interface 800 shows the module item 412 being mapped to deployment target item 422 as represented by arrow 831, and module item 414 being mapped to deployment target item 423 as represented by arrow 832. These latter two mappings are different than the mappings of the user interface 400 of FIG. 4 that was first displayed. The user might navigate to yet other solutions as well by, for example, using the scroll bar. The highest ranked solutions may be the first to be displayed, with subsequently displayed solutions being less-ranked. Once again, if the user imposes constraints on the mapping (e.g., by selecting a correlation of a module item to a deployment target item), then the solutions that do not satisfy that constrain may be eliminated, thereby potentially allowing for dynamic reduction of the available solutions.

FIGS. 9 through 12, and the corresponding description, show how the deployment engine may automatically identify a correlation between modules and deployment targets, and may automatically deploy the modules onto the selected deployment target.

Figure 9:
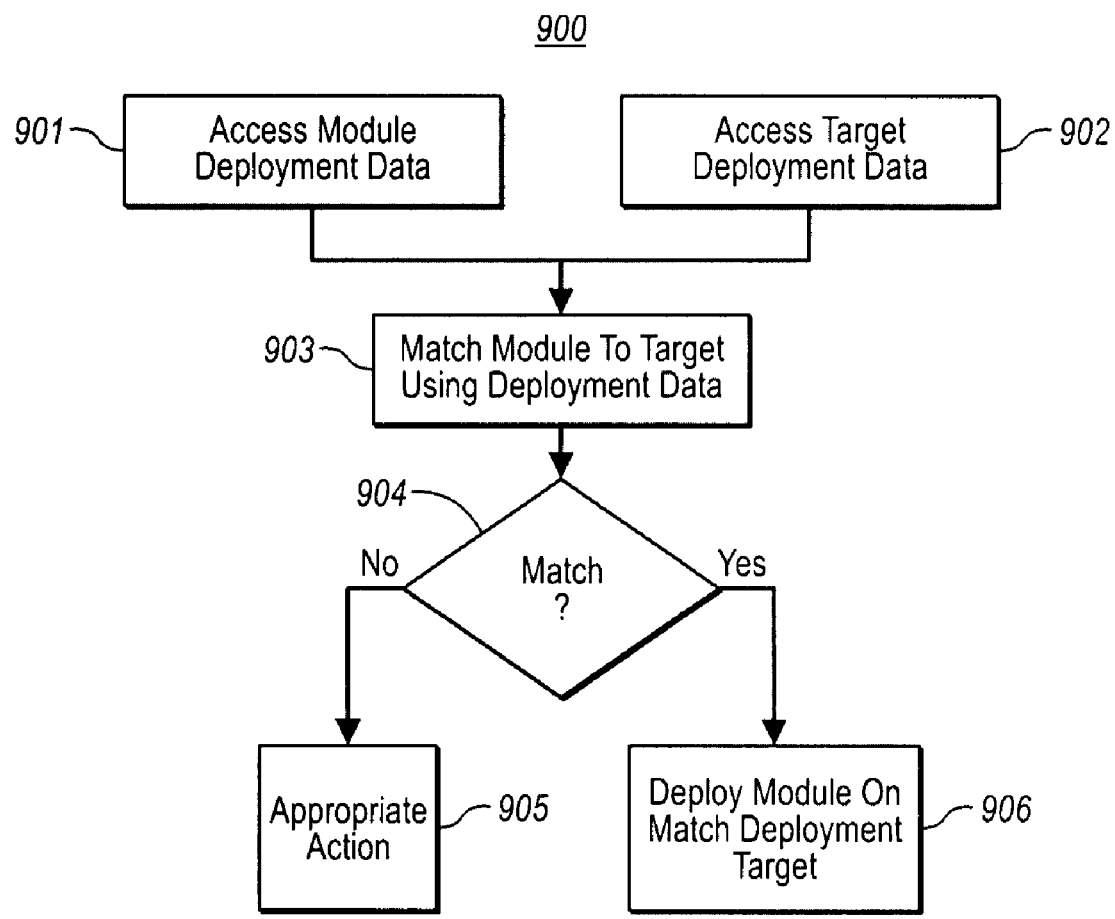
FIG. 9 illustrates a flowchart of a method for deploying a distributed application in a distributed environment.

FIG. 9 illustrates a flowchart of a method 900 for deploying modules of a distributed application into a distributed application using declarative deployment data. The method 900 may be performed for each of multiple modules in the distributed application, and may even be performed for all of the modules in the distributed application. The method 900 may be performed in parallel for the multiple modules, or may be performed sequentially, or a combination thereof.

Referring to FIG. 9, for each module in the distributed application, the deployment engine 901 access declarative deployment data for the module (act 901). For instance, referred to FIG. 2, the deployment engine 201 has access to a repository 240. In this description, the terms "declarative deployment data", "deployment model" and simply "model" may be used interchangeably. The module representations 242 may be declarative deployment data for each of the modules 211 through 217. The application representation 241 may also be declarative and may also be used to identify constraints in assigning modules to deployment targets, and in properly deploying the modules to a corresponding target.

In this description, "declarative" data means data that is associated with a particular name (i.e., a name-value pair) where the association is implied by a schema. For instance, extensible Markup Language defines hierarchically structured data in which each node in the hierarchy includes an associated name-value pair. The document may be further defined by an appropriate schema. There may be schemas that define module models, application models, runtime models, host models, and so forth. Alternatively, one or more of the models may be defined by a single schema.

The declarative deployment data represents a plurality of deployment requirements for the module. In some cases, the deployment data represents that the module is to be deployed onto a specific machine. The declarative deployment data may also specify that the module is to be deployed on a different physical machine than one or more other identified modules. Alternatively or in addition, the declarative deployment data may specify that the module is to be deployed on the same physical machine as one or more other identified modules.

In this description, a module is deployed on a target machine when the module is made operational on the target machine. This may involve 1) installing the module on the target machine, 2) configuring the module so as to be operational, 9) performing any further action on the machine (such as a reboot of the physical machine, and/or reinitializing of one or more applications on the physical machine), and/or 10) adjusting operating system data on the physical machine (such as a registration table).

Alternatively or in addition, the declarative deployment data may specify a preferred target machine onto which the module is to be deployed, even though the target machine might not be a required deployment target. The deployment data may not specify a required or preferred target machine at all, but may also specify desirable or required properties of a suitable deployment target machine. In that case, the declarative deployment data may also specify a prioritization for the property. For example, there might be one level of prioritization that indicates that a particular characteristic is required of the target machine, another to indicate that the characteristic is strongly preferred, another to indicate that the characteristic is moderately preferred, yet another to indicate that it is weakly preferred. Other granularities for specifying a degree of preference may also be used.

The declarative deployment data in general describes the requirements, capabilities and other properties of the module. While this is quite general, specific examples will now be provided.

The declarative deployment data for the module may specify a particular technology type of the module. For instance, a module may be of a database technology type, a Web Services technology type, a BizTalk technology type, a SharePoint technology type, and so forth for other existing and yet to be developed technology types.

The declarative deployment data may also specify a required runtime for the module. Example runtimes includes, SQL, IIS, WebServices, BizTalk, Sharepoint, etc. Runtimes generally support execution of module of one or more technology types. For instance, SQL runtimes support modules of a database technology type.

The declarative deployment data may include specify a security isolation requirement for the module. For example, this might include whether the module may be shared, requires an exclusive process, requires an exclusive machine, or other required or preferred security parameters.

The declarative deployment data may specify minimum required and/or preferred and maximum required or preferred resources such as, for example, CPU speed, numbers of CPUs, available and total memory space, available and total disk space, disk access speeds, network access latency and bandwidth, and so forth.

The declarative deployment data may also specify the availability requirements for the target machine. For instance, the module might require a 99.9999% uptime.

The declarative deployment data might also specify the scalability requirements for the module. For instance, the data might specify whether or not the module can be deployed to machine clusters.

Referring back to FIG. 9, before, after and/or during the time that the module declarative data is accessed (act 901), the deployment engine also access declarative deployment data for the various deployment targets (act 902) in the distribute environment (act 902). For instance, in FIG. 2, the deployment engine 201 access the machine representations 244 and the various runtime representations 243 of the target machines. Accordingly, in one embodiment, the deployment data for each deployment target describes at least one characteristic of the physical machine and at least one characteristic of a runtime present on the physical machine. In the illustrated embodiment, perhaps there are runtime models 243A through 243D that describe characteristics of the various runtimes 231 through 234, respectively.

For instance, the machine representations 244 may identify a name for the physical machine, identify runtimes available on the physical machine, and may identify a license type for the physical machine. From this information, the deployment engine 201 may identify a name for physical machine 221, may determine that one runtime 231 is running on the physical machine 221, and may identify that the deployment engine 201 is properly licensed to deploy modules of the distributed application 210 on to the physical machine 221. Similarly, the deployment engine 201 may identify a name for physical machine 222, may determine that one runtime 232 is running on the physical machine 222, and may identify that the deployment engine 201 is properly licensed to deploy modules of the distributed application 210 on to the physical machine 222. Finally, the deployment engine 201 may identify a name for physical machine 223, may determine that two runtimes 233 and 234 are running on the physical machine 223, and may identify that the deployment engine 201 is properly licensed to deploy modules of the distributed application 210 on to the physical machine 223. Similar determinations may be made for yet other potential target machines in the distributed environment.

The machine representations 244 may be declarative and may also include properties such as computer model, a number of processors, a processor speed, an available memory, an available disk space, a memory access speed, or a disk access speed or the like. The machine representations 244 may also specify that a total processing power used by all of the modules on a particular machine is to remain below a particular level, and/or that the total memory used by all of the modules on a particular machine is to remain below a particular level.

The runtime representations 243 may also be declarative and includes declarative deployment data for each runtime. For instance, runtime module 243A describes properties and requirements of the runtime 231. Likewise runtime models 243B through 243D describe properties and requirements of corresponding runtimes 232 through 234.

The runtime declarative deployment data 243 describes generally properties, characteristics, and/or requirements of the runtime. For instance, the runtime deployment models may include a technology type supported by the runtime, a version of the runtime, or a clustering support status for the runtime.

Returning to FIG. 9, once the relevant deployment models are accessed (act 901 and act 902), the deployment engine automatically performs a matching operation for the module to a particular deployment target (act 903). Recall that a particular combination of a runtime and a physical machine is one example of a deployment target. This step is performed automatically using the various deployment data of the modules, runtimes, and hosts. For each module, this matching operation may result in zero or more matches of the module to deployment targets.

If there is not a match (No in decision block 904), then appropriate action is taken (act 905). For example, a message may be sent to a user of the deployment engine 201 indicating that the constraints for the module need to be relaxed, or perhaps that a particular runtime needs to be first deployed or upgraded on a particular target machine before the module can be deployed on the machine, or the like. On the other hand, if there is a match (Yes in decision block 904), then appropriate action may be taken. For instance, the match may be cataloged as one of the solutions to be presented to the user through a user interface. Alternatively, the module may be simply deployed on the matched deployment target (act 906). A method for deploying will be described further below with respect to FIG. 12.

The deployment method 900 of FIG. 9 may be performed whenever the distributed application 210 is to be deployed in the deployment environment 220. This may be appropriate, for example, when the distributed application 210 is first deployed in the deployment environment 220. However, there may be circumstances in which the distributed application 210 should be redeployed into the distributed environment 220, even sometimes long after it was first deployed in that environment.

Figure 10:
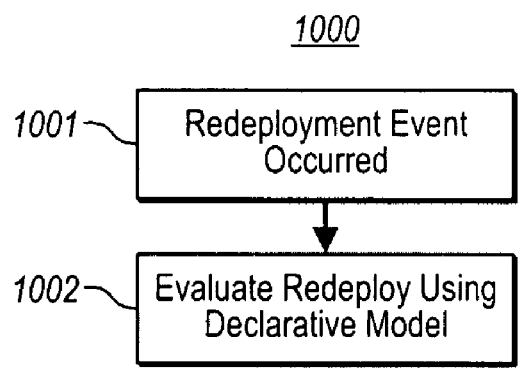
FIG. 10 illustrates a method for redeploying a distributed application in response to redeployment events.

FIG. 10 illustrates a flowchart of a method 1000 for redeploying the distributed application into the distributed environment. First, it is determined that a redeployment event has occurred (act 1001). The redeployment event may not necessarily result in redeployment of the distributed application, but may result in an automated evaluation regarding whether the redeployment should occur (act 1002).

The redeployment event may be, for example, that a user has initiated a redeployment request that is received at the deployment engine. However, the redeployment event may also be dependent upon events unrelated to user requests. For instance, redeployment evaluations may be made at predetermined intervals. Alternatively or in addition, a redeployment evaluation may occur when the distributed application or the distributed environment has changed and/or when the declarative deployment models for the distributed application and the distributed environment have changed.

For example, perhaps the user has relaxed the deployment requirements of one or more modules or of the application as a whole. This might result in a different redeployment of the application, even though the application itself might not have changed. Alternatively, the changed application model or module model may have resulted from an actual change in the distributed application. For example, perhaps the distributed application has been upgrade.

Furthermore, a reevaluation may be appropriate in the case of an actual change to the deployment model of the distributed environment. For example, perhaps the user realized that a particular runtime supports more than the technology types previously realized. The distributed environment may also have changed. For instance, there may have been a catastrophic event that reduce or eliminate some of the functionality of the underlying physical machines of the distributed environment. Also, perhaps one of the physical machines has been physical upgraded (e.g., with more memory, faster disks, or the like), or perhaps an additional, different, or upgraded runtime is installed and made operational on or more physical machines.

Figure 11:
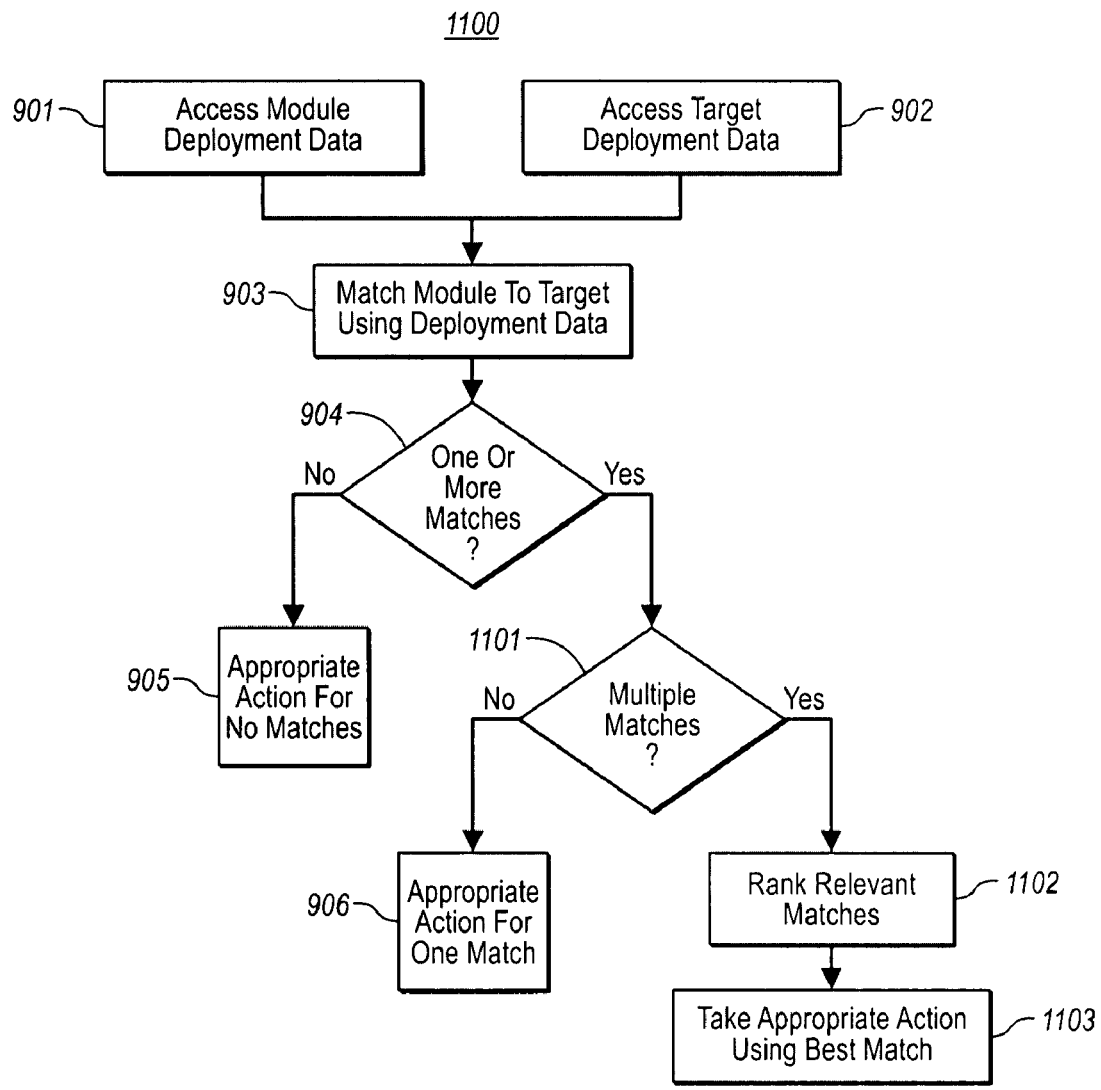
FIG. 11 illustrates a flowchart of a method for deploying a distributed application in a distributed environment in accordance with another embodiment.

If a redeployment event has occurred (act 1001), the deployment evaluation of FIG. 9 may once again be performed (act 1002). FIG. 11 describes an alternative deployment evaluation that performs also a ranking in the case that there are multiple solutions to the matching of a particular module to a deployment target. The method of FIG. 11 will now be described, and may also be performed in act 1002 upon determining that a reevaluation event has occurred, or may simply be performed upon initial deployment of the distributed application.

FIG. 11 illustrates a flowchart of a method 1100 for deploying a distributed application to a distributed environment. The method 1100 of FIG. 11 is similar to the method 900 of FIG. 9. The illustrated portions of the method 1100 include accessing of the declarative deployment data for the module (act 901) and the prospective deployment targets (act 902), and performing a matching operation of the modules to targets using the declarative deployment data (act 903). If there are no matches (No in decision block 904), then appropriate action may be taken given that there are no matches (act 905). Such appropriate action may be the same as described with respect to act 905 of FIG. 9.

However, if there are one or more matches (Yes in decision block 904), then it is determined whether there is but a single match of the module to a deployment target (decision block 1101). If there is only one match (No in decision block 1101) that resulted from the matching operation act 903, then appropriate action may be taken given that there is only one match (act 906). This may include simply deploying the module to the single matched deployment target, but may also include other actions such as, for example, relaxing the constraints until there are multiple matches between the module and deployment targets.

If there are multiple matches of a module to various deployment targets (Yes in decision block 1101), then the resultant matches are ranked (act 1102). The principles of the present invention are not limited to a particular ranking mechanism, nor is there any requirement regarding accuracy of such a ranking mechanism. The ranking mechanism may be automated, may be user driven, or may be a combination of user input and automation. Once the various resultant matches are ranked (act 1102), then appropriate action is taken given the best match. For instance, the module may be deployed on the best match deployment target (act 1103).

Figure 12:
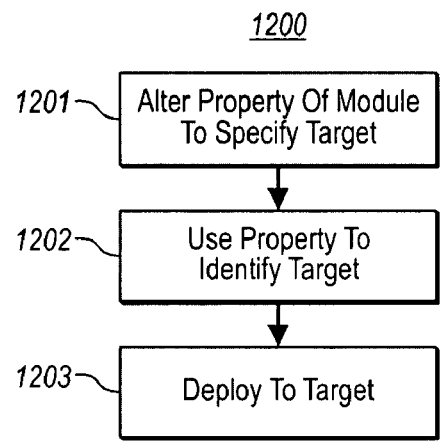
FIG. 12 illustrates a flowchart of a method for deploying a module of a distributed application onto a deployment target.

FIG. 12 illustrates a flowchart of a method 1200 for deploying a module onto a deployment target. However, the principles of the present invention are not limited to the method 1200 of FIG. 11. According to the method 1200, once a deployment target for the module is identified, a property of the module may be altered to specify expressly or implicitly the deployment target (act 1201). At the time of deployment, the property may be verified so that the deployment engine may also identify the deployment target for the module (act 1202). The deployment engine may then cause the module to be deployed on the identified deployment target (act 1203). This may be done by having the module installed and configured on the deployment target and, if necessary, reconfiguring the target environment, or perhaps rebooting the target computing system and/or restarting one or more applications.

When leveraging the declarative model embodiments of FIGS. 9 through 12, a number of embodiments of the user interface can be employed.

User can explicitly specify for a module to be deployed on a specific machine. Such association can be shown in a way that is different from auto-created associations that are result of running the optimization algorithm. The user experience may be improved by interactively showing the user how possible solution set expands and shrinks as new constraints/goals are added and removed. The user interface might also suggest alternatives or ask for relaxation of specific constraints if no solution is found with the current set of goals/constraints (like the user needs to add a machine with a specific configuration in order to achieve at least one feasible solution, or increase memory/processing power on some machine). The user interface might also provide defaults for properties and characteristics for common deployment scenarios (high-throughput, uptime maximization, test environment).

Accordingly, the embodiments described herein provide a rich and helpful user interface that may be used when deploying modules of a distributed application into various deployment targets of a distributed environment. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing an interactive user interface for displaying mappings between a plurality of modules of a distributed application and a plurality of deployment targets in a distributed environment to which the plurality of modules are deployed, the method comprising:

an act of a computing system, which includes one or more processors, accessing a plurality of module representations, each corresponding to one of the plurality of modules of the distributed application, each module representation comprising declarative deployment data for a corresponding module that describes requirements and capabilities of the corresponding module, including a required runtime of the corresponding module;

an act of the computing system accessing a plurality of deployment target representations, each corresponding to one of the plurality of deployment targets, each deployment target representation comprising declarative deployment data describing physical characteristics and runtime characteristics of a corresponding deployment target, each deployment target comprising a particular combination of a particular physical machine and a particular runtime present on the particular physical machine;

an act of the computing system identifying one or more correlations between the plurality of modules and the plurality of deployment targets, based on the module representations and the target representations, including at least matching a required runtime of each of the plurality of modules with one or more deployment targets;

an act of the computing system using the plurality of module representations to display a plurality of module items at the interactive user interface, each module item representing one or more modules of the plurality of modules of the distributed application;

an act of the computing system using the plurality of deployment target representations to display a plurality of deployment target items at the interactive user interface, each deployment target item representing one or more deployment targets of the plurality of deployment targets in the distributed environment; and an act of the computing system displaying a correlation item for each of the identified one or more correlations, each correlation item representing a correlation between a module of the plurality of modules of the distributed application and a corresponding deployment target of the plurality of deployment targets in the distributed environment.

2. A method in accordance with claim 1, further comprising an act of altering at least one of the following in response to user input;

a) the manner in which the plurality of module items are displayed;

b) the manner in which the plurality of deployment target items are displayed;

c) the manner in which the correlation items are displayed; or d) the identity of a particular deployment target to which a particular module is correlated.

3. A method in accordance with claim 1, wherein:

each module representation also comprises declarative deployment data describing additional requirements and capabilities, including one or more of: a particular technology type, security isolation requirements, minimum required physical resources, availability requirements, or scalability requirements of the corresponding module; and the act of the computing system identifying one or more correlations between the plurality of modules and the a plurality of deployment targets comprises matching at least one of the additional requirements and capabilities with one or more deployment targets.

4. A method in accordance with claim 1, further comprising:

an act of the computing system accessing a plurality of runtime representations for a plurality of runtimes, each describing properties, characteristics, and requirements of the corresponding runtime;

an act of the computing system accessing a plurality of machine representations for a plurality of physical machines, each describing physical characteristics of the physical machine and one or more runtimes available on the physical machine; and an act of the computing system accessing a runtime-machine mapping that that identifies runtimes that are present on each physical machine to formulate the plurality of deployment target representations.

5. A method in accordance with claim 4, wherein a plurality of runtimes are present on at least one physical machine, and wherein formulating the plurality of deployment target representations comprises formulating a different deployment target representation for each physical machine/runtime combination.

6. A method in accordance with claim 1, further comprising:

an act of the computing system accessing an application representation that identifies constraints in assigning modules to deployment targets, and in properly deploying modules to corresponding targets.

7. A method in accordance with claim 1, wherein the declarative deployment data for at least one module representation specifies one or more of: that the corresponding module is to be deployed on a specific physical machine, that the corresponding module is to be deployed on a different physical machine than one or more other modules, or that the corresponding module is to be deployed on the same physical machine as one or more other modules.

8. A method in accordance with claim 1, wherein at least one of the deployment target items visually displays properties of a corresponding deployment target, including:
 runtime properties, including a corresponding particular runtime's name, technology type, and version; and
 physical machine properties, including a corresponding particular physical machine's name, available memory, and CPU speed.

9. A computer program product comprising one or more computer storage devices having thereon one or more computer-executable instructions that are structured such that, when executed by one or more processors of a computing system, the computing system performs a method for providing an interactive user interface for displaying mappings between modules of a distributed application and deployment targets, the method comprising:
 an act of accessing a plurality of module representations, each module representation representing a module of a plurality of modules of a distributed application and comprising declarative deployment data for the module that identifies one or more requirements and one or more capabilities of the module, including at least a required runtime of the module;
 an act of using the plurality of module representations to display a plurality of module items at an interactive user interface, each module item representing one or more modules of the plurality of modules of the distributed application and visually indicating at least one capability each of the one or more modules;
 an act of accessing a plurality of deployment target representations, each deployment target representation representing a deployment target of a plurality of possible deployment targets in a distributed environment and comprising declarative deployment data describing one or more physical characteristics and identifying a runtime the deployment target, wherein each deployment target comprises a particular combination of a particular physical machine and a particular runtime present on the particular physical machine;
 an act of using the plurality of deployment target representations to display a plurality of deployment target items at the interactive user interface, each deployment target item representing one or more deployment targets of the plurality of possible deployment targets in the distributed environment;
 an act of identifying a correlation between a particular module of the plurality of modules of the distributed application and a corresponding particular deployment target of the plurality of deployment targets in the distributed application based on a corresponding particular module representation and a corresponding particular target representation, including at least matching a required runtime of the corresponding particular module representation with the corresponding particular target representation;
 an act of displaying a correlation item representing the identified correlation between the particular module and the particular deployment target; and
 an act of altering at least one of the following in response to user input; a) the manner in which the plurality of module items are displayed; b) the manner in which the plurality of deployment target items are displayed; c) the manner in which the correlation item is displayed; or d) the identity of the particular deployment target to which the particular module is correlated.

10. The computer program product in accordance with claim 9, wherein each module item includes a representation of at least one property of the one or more modules represented by the module item.

11. The computer program product in accordance with claim 9, wherein the computer program product is capable of altering all of the following in response to user input:
 a) the manner in which the plurality of module items are displayed;
 b) the manner in which the plurality of deployment target items are displayed;
 c) the manner in which the correlation item is displayed; or
 d) the identity of the particular deployment target to which the particular module is correlated.

12. The computer program product in accordance with claim 9, wherein the computer program product is capable of altering at least one of the following in response to computationally comparing at least some of the plurality of module representations to the at least the plurality of deployment target representations:
 a) the manner in which the plurality of module items are displayed;
 b) the manner in which the plurality of deployment target items are displayed;
 c) the manner in which the correlation item is displayed; or
 d) the identity of the particular deployment target to which the particular module is correlated.

13. The computer program product in accordance with claim 9, wherein the computer program product is capable of altering at least one of the following in response to a change in at least one of the plurality of module representations:
 a) the manner in which the plurality of module items are displayed;
 b) the manner in which the plurality of deployment target items are displayed;
 c) the manner in which the correlation item is displayed; or
 d) the identity of the particular deployment target to which the particular module is correlated.

14. The computer program product in accordance with claim 13, wherein the changed module representation comprises a group of declarations, wherein the change is made by adding, deleting, or altering at least one declaration of the group of declarations.

15. The computer program product in accordance with claim 9, wherein the computer program product is capable of altering at least one of the following in response to a change in at least one of the plurality of target representations:
 a) the manner in which the plurality of module items are displayed;
 b) the manner in which the plurality of deployment target items are displayed;
 c) the manner in which the correlation item is displayed; or
 d) the identity of the particular deployment target to which the particular module is correlated.

16. The computer program product in accordance with claim 9, wherein the act of using the plurality of module representations to display a plurality of module items comprises the following:

an act of selecting for display only those modules of the plurality of modules of the distributed application that have one or more identified criteria in common, wherein the plurality of module items cumulatively represent only the selected modules.

17. The computer program product in accordance with claim 16, wherein the act of using the plurality of deployment target representations to display a plurality of module items comprises the following:

an act of selecting for display only those deployment targets of the plurality of deployment targets in the distributed application that have one or more identified criteria in common, wherein the plurality of deployment target items cumulatively represent only the selected deployment targets.

18. The computer program product in accordance with claim 9, wherein the act of using the plurality of module representations to display a plurality of module items comprises the following:

an act of identifying a group of two or more modules sharing one or more identified criteria; and an act of representing the identified module group in collapsed form using a single module item.

19. The computer program product in accordance with claim 18, wherein the method further comprises the following:

upon detecting a user input representing an instruction to decollapse the single module item into constituent module items, each constituent module items representing one of the modules in the identified group of modules.

20. A computer program product comprising one or more computer storage devices having thereon one or more computer-executable instructions that are structured such that, when executed by one or more processors of a computing system, the computing system performs a method for providing a navigation mechanism for permitting a user to navigate through a plurality of identified solutions for mapping a plurality of modules of a distributed application to a plurality of deployment targets in a distributed environment, the method comprising:

an act of identifying a plurality of solutions for mapping a plurality of modules of a distributed application to a plurality of deployment targets, comprising: an act of processing a plurality of module representations corresponding to the plurality of modules of the distributed application, each module representation comprising declarative deployment data for the corresponding module that describes requirements and capabilities of the corresponding module, including a required runtime of the corresponding module;

an act of processing a plurality of deployment target representations corresponding to the plurality of deployment targets, each deployment target representation comprising declarative deployment data describing physical characteristics and runtime characteristics of the corresponding deployment target, each deployment target comprising a particular combination of a particular physical machine and a runtime present on the particular physical machine;

an act of identifying the a plurality of solutions by identifying~correlations between the plurality of modules and the a plurality of deployment targets by at least matching a required runtime of each of the plurality of modules with one or more deployment targets;

an act of displaying one solution, a first solution, of the plurality of solutions, wherein the display of the first solution includes a plurality of module items, a plurality of deployment target items, and at least one correlation item representing the mapping between the plurality of modules and the plurality of deployment targets, wherein each module item represents one or more modules of the plurality of modules of the distributed application, and each deployment target item represents one or more deployment targets of the plurality of possible deployment target in the distributed environment; and in response to detecting a navigation instructions from a user, an act of displaying another solution, a second solution, of the plurality of solutions, wherein the display of the second solution also includes a plurality of module items, a plurality of deployment target items, and at least one correlation item representing a mapping between the plurality of modules and the plurality of deployment targets.

* * * * *